(No Model.) 3 Sheets—Sheet 1.
J. S. HIBBETS.
SEEDING ATTACHMENT FOR PLOWS.
No. 402,243. Patented Apr. 30, 1889.
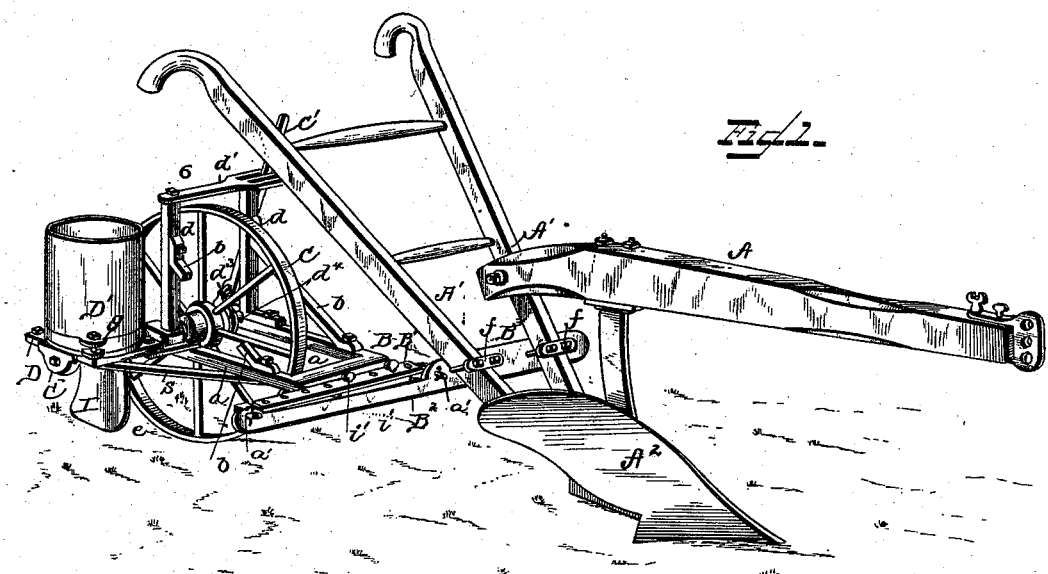
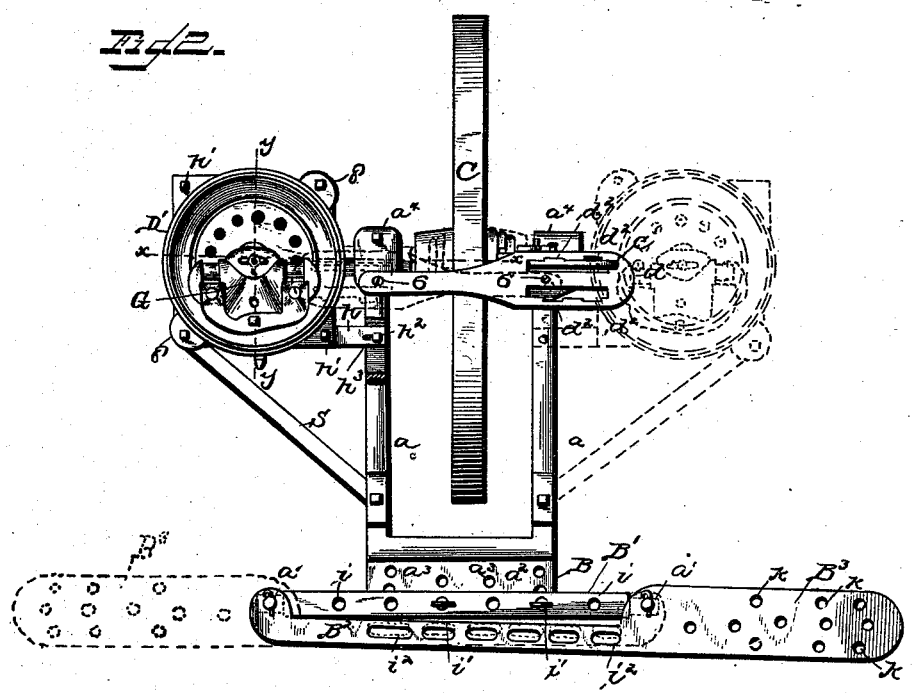
WITNESSES,
F. L. Ourand
E. E. Higdon
INVENTOR.
James Seymour Hibbets.
By J. O. Higdon
Attorney.

(No Model.) 3 Sheets—Sheet 2.
J. S. HIBBETS.
SEEDING ATTACHMENT FOR PLOWS.
No. 402,243. Patented Apr. 30, 1889.
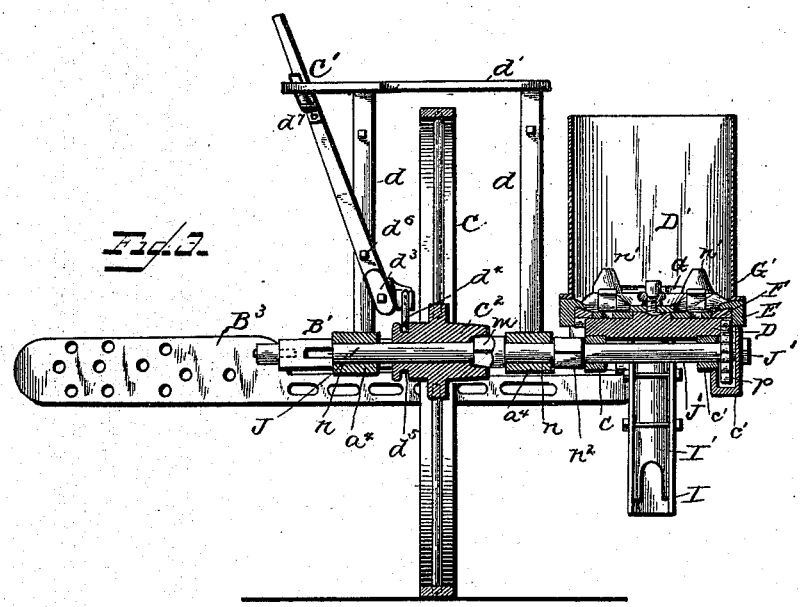
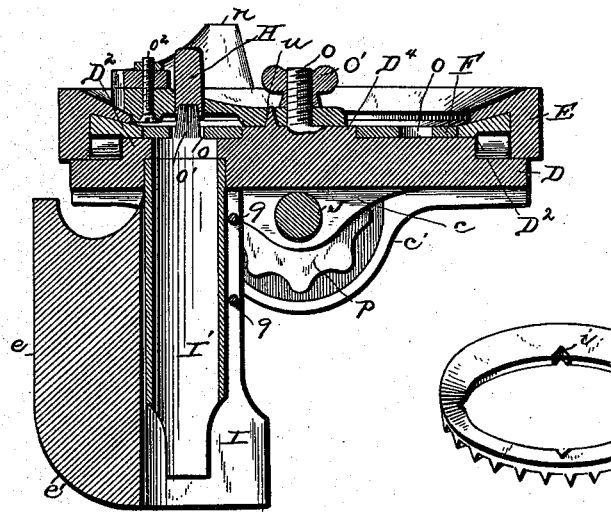
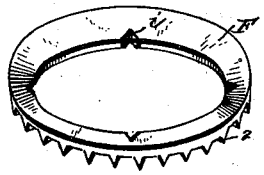
WITNESSES
F. L. Ourand
E. E. Higdon
INVENTOR
James Seymour Hibbets
By J. C. Higdon
Attorney (No Model.) 3 Sheets—Sheet 3.
J. S. HIBBETS.
SEEDING ATTACHMENT FOR PLOWS.
No. 402,243. Patented Apr. 30, 1889.
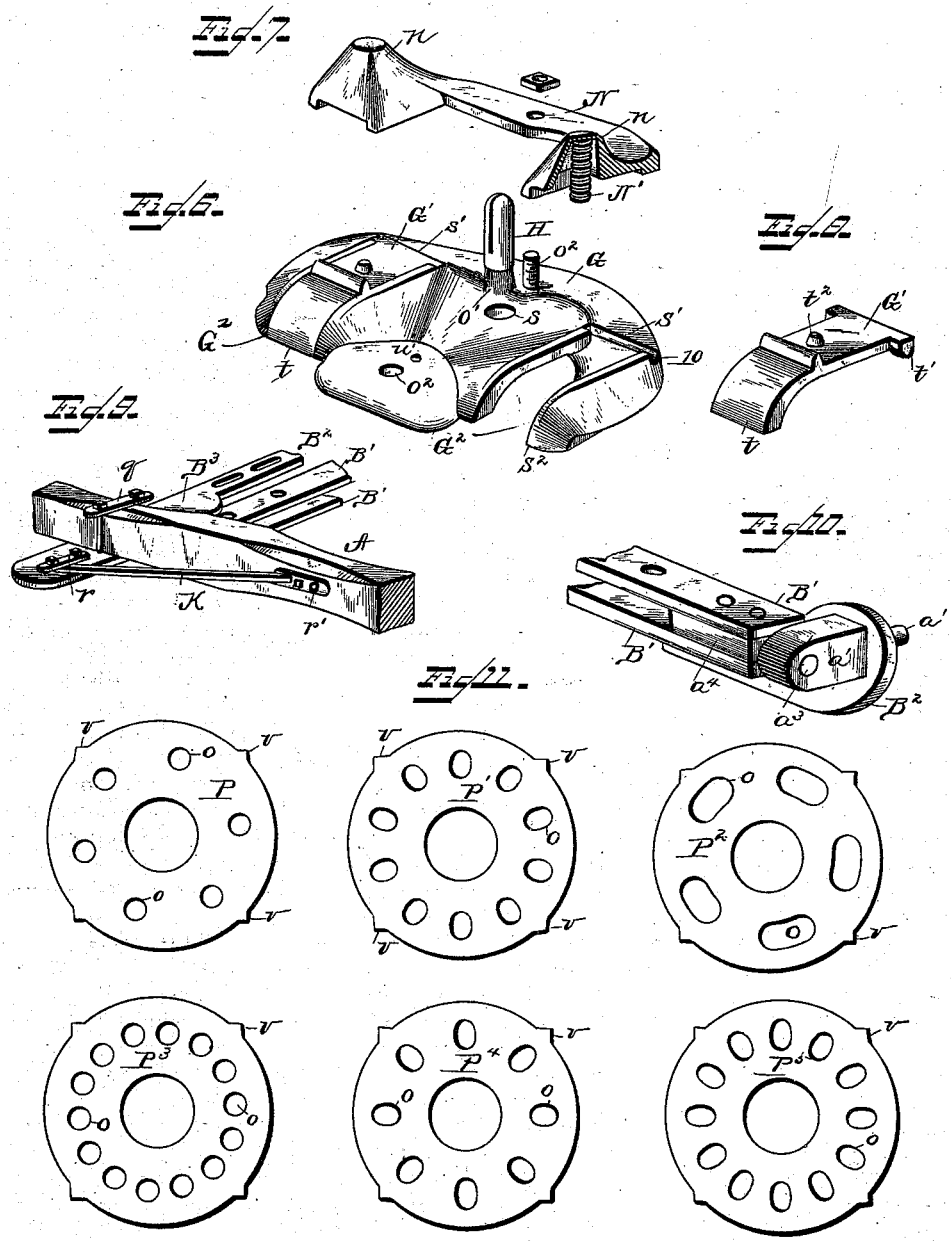
WITNESSES.
F. L. Ourand
E. E. Higdon
INVENTOR
James Seymour Hibbets
By J. E. Higdon
Attorney

UNITED STATES PATENT OFFICE.

JAMES SEYMOUR HIBBETS, OF LUDELL, KANSAS.

SEEDING ATTACHMENT FOR PLOWS.

SPECIFICATION forming part of Letters Patent No. 402,243, dated April 30, 1889.

Application filed October 30, 1888. Serial No. 289,538. (No model.)

*To all whom it may concern:*

Be it known that I, JAMES SEYMOUR HIBBETS, of Ludell, Rawlins county, Kansas, have invented certain new and useful Improvements in Corn or Cane Planting Attachments for Plows, of which the following is a full, clear, and exact description, reference being had to the accompanying drawings, forming a part hereof.

This invention relates to an improvement in seeding attachments for plows, the primary object in view being to provide a simple device which may be removably and adjustably attached to any plow of the type known as "walking-plows," and which will, when in use, deposit corn or other seed at spaced intervals continuously while the plow is operated to turn the soil and loosen it, the depth of the seed deposited being made changeable by simple means, and also the number and distance apart of the grains as well as rows of seed planted.

A further object is to furnish a seeding device that is adapted for attachment to a right or left hand plow, and which may be conveniently secured adjustably to the handles of such plows to operate in the rear of the plow proper, or be removably attached to the plow-beam, so as to operate in advance of the mold-board and plow-point, either position affording equally good results in the matter of seeding at spaced intervals in hills or drilling seed in rows at short distances apart.

A further object is to provide a seeding attachment for right or left hand plows, which is afforded an independent vertical play, so as to enable it to conform to the undulations of the ground operated on, and also to furnish a ready means for the starting or arresting of the seeding mechanism while the plow is in forward motion turning a furrow-slice.

With these objects in view my invention consists in certain features of construction and combinations of parts, which will be hereinafter described, and pointed out in the claims.

Referring to the drawings, making a part of this specification, Figure 1 is a perspective view of a walking-plow with my improved seeding attachment in position thereon. Fig. 2 is a top plan view of the seeding device disconnected from the plow. Fig. 3 is a rear elevation of the seeding device, shown in section, taken on the line $x\,x$, Fig. 2. Fig. 4 is a transverse sectional elevation of the seeding mechanism, taken on the line $y\,y$, Fig. 2. Fig. 5 is a detached and enlarged view of one of the details of the seeding mechanism. Figs. 6, 7, and 8 are detached and enlarged views of important details of the grain-feeding device. Fig. 9 is a view of a portion of a plow-beam with an attached portion of the seeding attachment, showing the plan of connecting it adjustably thereto, so as to operate the grain-dropping mechanism is advance of the mold-board and plowshare of the plow. Fig. 10 is an enlarged portion of one end of the trunnioned clamp that is employed to secure adjustably the seeding apparatus to the handles or beam of a walking-plow. Fig. 11 exhibits a series of seed-dropping disks that are adapted to be interchangeable and afford means for graduating the number of seeds or grains dropped and regulate the distance apart between individual grains or clusters of the same in hills that are spaced evenly apart.

A is the plow-beam, A' the handles, and $A^2$ the mold-board, of a plow of any approved construction. The beam and handles may be of either wood or metal.

In Fig. 1 the seed-planter is shown as attached to the handles of the plow and located to the rear of the mold-board $A^2$.

As will be seen, the seeding device displayed in the several figures of the drawings consists of a frame, B, composed of two parallel bars, $a$, that are integrally connected at their front ends by a flat plate, $a^2$, these limbs or bars terminating at their rear ends in boxes $a^4$, which are made separable to permit them to receive a driving-shaft, J, that will be further alluded to in its proper order. On the tops of the boxes $a^4$ two posts, $d$, are erected vertically and parallel to each other, said posts being held firm at their upper ends by the cap-plate $d'$, which is secured thereto by set bolts or screws 6, which will permit the cap-plate to be removed or reversed in position, if necessary. The upright posts $d$ are laterally stiffened by the diagonal braces $b$, (see Fig. 1,) these extending from the bars $a$ of the frame B to engage the sides of the upright posts, as shown. In the boxes $a^4$ of the frame B the driving-shaft J is revolubly secured, said shaft being journaled therein, as shown in Fig. 3. Upon the shaft just mentioned the operating and bearing wheel C is loosely mounted, said wheel having its hub $C^2$ bored out to provide a sliding fit of the same upon the round body of the shaft, the wheel being thus located between the posts $d$. A portion of the hub $C^2$ is formed into a square cavity at one end, so as to adapt it to receive the squared portion $m$ of the shaft J, this squared socket being tapered outwardly to enlarge its outer end, and thus allow the squared shaft to enter the same freely when the wheel is shifted endwise upon the shaft. A concentric groove, $d^5$, is cut in the outer surface of the hub $C^2$, and in this the crotched limb $d^4$ of the lever C' is inserted, said lever being pivotally attached at $d^6$ to one of the posts $d$, as shown in Fig. 3. The upper portion of the lever, passing through a longitudinal slot of the cap-plate $d'$, is provided with a spring, $d^7$, which latter engages either of the notches $d^2$, made in the edges of the elongated slot in the cap-plate $d'$, so that if the lever is vibrated the wheel C will be moved endwise on the shaft J and locked thereto or be disengaged therefrom in an obvious manner.

It may here be stated that to afford means for the changing of the adjustment of the seeding device from right to left hand plows, or the reverse, it is necessary that the crotched limb $d^4$ be made adjustable, so that it may be caused to project from either edge of the lever C'; hence said piece $d^4$ is secured to the lower end, $d^3$, of the lever in any suitable manner to permit the change mentioned and hold it stable in either position.

On the portion of the shaft J which projects beyond the outer journal of the same an enlargement, $n^2$, is formed to produce a proper collar, that bears against the end of the box $a^4$, in which the journal revolves, while the additional enlargement or squared portion $m$, which has contact with the opposite end of said box, serves to prevent endwise movement of the shaft. On a rounded extension, J', of the shaft J a base-plate, D, is mounted, it having perforated bracket-ears $c$, formed or secured on its lower side, which loosely engage the portion J', as shown in Figs. 3 and 4.

The base-plate D has a central integral circular projection, $D^4$, formed on its top face, which face is rendered true by any suitable means, and another offset is formed at $D^2$, which is concentric with a central projecting stud or bolt, O, that is inserted securely in the base-plate, so as to project a proper distance above it, for a purpose which will be presently explained.

The outer end of the rounded portion J' of the shaft J is squared and reduced in diameter to receive and hold in place a pinion, $p$, which latter has a square hole centrally formed in it to permit such an engagement with the shaft. Outside of the toothed pinion $p$ the shaft J is further reduced to form a journal end, which enters a suitable perforation made for its reception in the bracket-box $c'$, that is fastened on the lower side of the base-plate D at its edge to give support to the end of the shaft J and aid in holding the pinion $p$ from displacement.

In order to retain the base-plate D in the same plane with the frame B, a laterally-projecting stay-bar, $h$, (see Fig. 2,) is bolted by its ends to the adjacent limb $a$ and edge of said base-plate, and to afford means for ready adjustment of the stay-bar the hole $h^3$ may be slightly elongated, as shown. A further means of securing and stiffening the base-plate D against draft-strain produced by contact of the seeding-shoe with the ground is afforded by the diagonal brace-rod S, which is bolted to the outer corner of the base-plate, and also to the nearest limb $a$ of the frame B.

Upon the portion of the base-plate D that projects outside of the shoulder $D^2$ a flat ring, F, is superimposed. Said ring is provided with gear-teeth (see Fig. 5) on its lower surface, that are in meshed contact with the teeth of the pinion $p$ when the flat ring is in position.

The upper face of the ring or annular plate, F, is preferably dished slightly toward its inner edge, and above this face, having loose contact therewith, the annular cap-piece E is mounted, it being recessed on its lower surface to fit over the toothed ring F, and bear upon the base-plate D, to which it is secured by bolts inserted through holes made in the ears 8 of the cap-piece E and corners of the base-plate. The upper surface of the circular cap-piece E is also dished or inwardly and downwardly sloped, as shown in Fig. 4, from its periphery to the inner edge, this latter being comparatively thin.

Upon the upper face of the base-plate D, and bounded by the inner edge of the toothed ring-plate F, the feed-disks (shown in Fig. 11) are located, or, to be more definite, one of these circular flat plates is placed thereon, having its edge in contact with the inner edge of the toothed ring F, to which it is locked by means of projections or angular toes $v$, formed at spaced intervals on the edge of the disks, said toes entering corresponding notches $i$, that are indented in the adjacent edge of the ring F, so that a revoluble movement of this ring effected by a rotation of the shaft J will also rotate the feed-disk, which is in place as stated. It will be noticed that the disks are annular, the central orifice in each being of such relative diameter to that of the projection $D^4$ as to permit either disk to be inserted in place and revolve on its seat when actuated, as before mentioned.

In each of the several feed-disks P, P', $P^2$, $P^3$, $P^4$, and $P^5$ (shown in Fig. 11) spaced perforations $o$ are cut or formed. These holes differ in size in each plate and also in their distance from each other. The function of the annular disks being to receive one or more grains or seeds and discharge the same at a proper point when the seeding mechanism is in operation, as will be further explained, it is evident that if there are few holes at regular distances from each other, and also from the outer edge of a disk, as shown in disk P, the intervals of periodical discharge of the grain or seed through these orifices will be comparatively greater than if the holes were nearer together, as in P³, the use of which will be made manifest by a further description of the operation of the device.

Upon the outer bounding portion of the top face of the cap-piece E the grain-holding chamber or hopper D' is secured by the same bolts that secure said cap-piece upon the base-plate D, (see Fig. 2,) suitably-perforated ears projecting from the outer surface of the cylindrical hopper near its lower end, to allow such an attachment of parts.

Directly above the feed-disk, which is in position as previously described, a guard-plate, G, is placed, which is seated upon the cap-piece E. The guard-plate covers about one half the area of the feeding-disk below it, and in general form is nearly semicircular, as shown in Figs. 2 and 6. An orifice, $O^2$, is made in the center of the guard-plate G through a lateral projecting portion, $G^2$, provided therefor. When in proper place, the stud O, which projects from the base-plate D, engages the orifice $O^2$ of the guard-plate G, and the winged thumb-nut O' affords means for securing the guard-plate to the base-plate at a central point in both, while the ready removal of the guard-plate is permitted by a removal of said clamping-nut O'.

In order to retain the guard-plate G in position and prevent it from shifting around, a dowel-pin, $u$, that projects from the base-plate D, near the center stud, O, enters a hole, $u'$, made for its insertion in the guard-plate, as shown in Fig. 4.

The grain-receiving orifices $o$, that are formed in the feed-disks P, P', $P^2$, $P^3$, $P^4$, $P^5$, are of the same radial distance from the center stud, O, although varying in distance apart, and also in their dimensions in different disks. Thus they are adapted to each register with the depending grain-conveying tube I', which is secured at a proper point to the lower side of the base-plate D, as shown in Fig. 4.

At the lower end of the seed-tube I' its wall is cut away on opposite sides to permit the free escape of grain, which falls through said tube, and the adjustable shoe I is secured as an envelope upon the outer surface of this tube by the clamping-bolts 9, which are inserted through holes made oppositely in the walls of the shoe near its rear edge, it being understood that the shoe is channeled vertically to produce a receiving-groove throughout its length for the free insertion of the tube I'.

From the front face of the shoe I a thin cutter-blade, $e$, is projected, which is rounded on its lower end, $e'$, to produce a runner, and thus adapt the shoe to move through the loose soil with the least possible obstruction to its progression.

It will be apparent from the form of construction of the shoe I and its method of attachment to the seed-conveying tube I' that the former named may be moved up or down to raise or lower it, and that it may thus be caused to penetrate the soil more or less deeply as the needs of the service it performs may require.

Inspection of Fig. 6 will show that the guard-plate G has two open slots, $G^2$, formed in it, which extend from $s'$ to the edge $s^2$ of said plate. These slots are provided to receive the scrapers or cut-offs G', that have projecting lugs $t$ formed on their rear ends, which lugs enter suitably-formed transverse grooves 10, made in the guard-plate at the rear edges of the slots $G^2$, so that when in place the scrapers have hinged engagement with the guard-plate and can vibrate vertically. At $s$ the guard-plate G is perforated to receive the shank or stem of a brush or ejector, H, said shank being composed of hard wood or spring-metal in tubular form, and slitted, as shown in Fig. 6, to permit it to be adjusted and held in any desired position, vertically considered, by reason of the spring action of the shank. The brush portion $o'$ of shank H is preferably made of elastic bristles; but spring-wire of proper fineness may also be used, and in use the brush $o'$ is so set with regard to the feed-holes $o$ in the disks P P', &c., that it will spring down into them as the disk is rotated, and thus cause any grain or seed which may stick in the holes to be ejected and pass down the tube I'.

In order to render the action of the scrapers G' effective in removing surplus seed from the feed-holes $o$ in the feeding-disks P P', &c., a spring-holder, N, is secured upon the guard-plate G by a screw-bolt, $o^2$, said holder being shown detached in Fig. 7, and, as will be seen, a spiral spring, N', is therein located, and is so retained and compressed above as to bear upon the scraper G' in such a manner that the latter will be yieldingly forced upon the surface of the feeding-disk and with its edge $t$ push away all seed above the feed-holes and permit only such as are in these holes to pass under the scraper on their way to the discharge-orifice made in the base-plate D, immediately in line with and above the conveyer-tube I'.

It is obvious that the action of the duplicate scrapers shown will be similar when the disks which feed the seed or grain are rotated in a proper direction, and two of said scrapers are provided to permit a reversal of motion of the grain-feeding mechanism which is necessary to accomplish a correct operation on a right or left hand plow.

The seeding device, which has been specifically described, must, to work efficiently, be so connected to a plow that it may be adjusted to deposit grain at a greater or less depth in the soil which has just been turned by the mold-board A², and it is also important that there be a means provided for the adjustment laterally of the seeder with regard to the unplowed land.

The desirable features mentioned are afforded by simple and effective parts of the machine, which will now be described.

A clamp composed of two flat bars, B', held spaced apart to afford an elongated slot between them, as shown enlarged in Fig. 10, is secured upon the end plate, a², of the frame B, suitable holes being formed in the plate and bars to receive the thumb-screws i', which, when in place, hold the bars clamped firmly on the plate a², and so retain the same intact with the frame B. The spacing-blocks a⁴, which are secured at each end of the clamping-bars B', are provided with journal ends a³, on which the perforated blocks a' are placed, these blocks having reduced bolt ends formed on them to enter and be secured in holes made in the bracket-arm B², so that the frame B and other parts of the seeding mechanism are thus hinged to this bracket-arm and permitted to play vertically. The portion B³ of the bracket-arm just mentioned is widened and provided with a series of perforations, k, which are so spaced apart as to receive the bolts which hold the clamp-plates f in contact with the plow-handles A', as shown in Fig. 1, thus securing the bracket-arm thereto with the seeding appliance located on the furrow side of the plow and sufficiently removed from the unplowed land to cause the shoe I to engage the freshly-plowed soil while the plow is in motion and turning a furrow. By the provision of a number of holes, i, the clamp B' may be shifted endwise a sufficient distance and secured, so that the seeder-shoe I will be located a greater or less distance from the furrow-track, as may be necessary.

It should be explained that the operating and bearing wheel C is adapted to travel immediately in the rear of the plow proper upon the furrow-bottom, while the shoe I and seed-conveyer spout I' are drawn through the plowed soil. It is necessary that there should be such a relative adjustment in the projecting length of the bracket-arm B², as well as the vertical adjustment of the shoe upon its supporting-tube I', that the seed or grain may be located the desired depth below the plowed surface of the ground operated upon. The further the bracket-arm B² is made to project laterally beyond the track of the plow the less depth will be given to the discharging end of the tube I', and, as before stated, the depth of seed planted may also be regulated by the vertical adjustment of the shoe I.

Should it be preferred to plant the seed or grain—such as corn—directly in the furrow-track, so as to be covered by the next furrow-slice cut by the plow, this may be effected by securing the seeding device directly in the rear of the plow proper, in which case the elongated holes i² are utilized for reception of the clamping-bolts which hold the clamps f in contact with the plow-handles A'.

Should it be preferred to give the seeding mechanism a position in advance of the mold-board A², the bracket-arm B² is clamped to the plow-beam A, as at q, (see Fig. 9,) and in order to render the attachment of the mechanism more secure the bracket-arm is braced by a clamped adjustment of the diagonal bar K, that may be either clamped on or bolted to the beam A, as shown.

The seeding mechanism that has just been described for use in connection with a walking-plow may also be used in conjunction with a gang of plows. In operation it is intended, if a single plow is used in a field, that at least two furrows be turned between the planted rows of corn, if corn is the seed used. A preferable mode of use is to provide a gang of three separate plows, one following the other, and upon the rear plow of the three have the seeding device secured, so that the operation of plowing and seeding will thus be rendered speedy and continuous.

Seeds of different kinds may be planted with the device which is the subject of my present invention—such as corn, sorghum, broom-corn, cotton-seed, peas, beans, &c.

The preferred use is the planting of corn, and by the employment of the different changeable feed-disks shown the grain may be deposited in rows a short distance apart. To do this a disk having its feed-perforations spaced as shown in plate P³ is employed. Where one grain only is to be dropped with considerable intervening space between them, a disk perforated as shown at P is used. Where more than one grain is to be deposited in close proximity, with spaces between these groups of grain, technically termed "hills," then the orifices are shaped and arranged as shown in P' P² P⁴, or closer, as in P⁵.

It will be readily comprehended that the actuating gear-wheel F and pinion p are so proportioned with regard to the progressive movement of the plow when in operation, that the disk in use will be revolved in unison therewith and space apart the seed or grain delivered through the disks into the tube I', and thence to the track opened by the shoe I.

Should it at any time be necessary to arrest the seeding operation while the plowing is continued, this may be instantly done by the lateral movement of the lever C', which will disconnect the shaft J from the wheel C, and thus at once arrest the rotary movement of the seed-dropping mechanism. This provision is one of value where the plow is alternately used to turn the intermediate furrows and then seed a third furrow, or at any other desired distance apart of the drilled rows or hills of corn.

When corn is drilled in for ensilage or the use of the stalks for fodder, it is not necessary to intermit the rows between furrows; but the seeding mechanism may be used with every furrow turned, and the closely-perforated disk—such as shown at P³—be employed to feed the corn-grains and deposit them in close proximity to each other.

The seeding device is shown as attached to a right-hand walking-plow. In order to secure it upon a left-hand plow it is simply necessary, as shown by dotted lines in Fig. 2, to remove the position of the bracket-arm B² by disconnecting it from the blocks a' and turning it over endwise. The blocks are then inserted and secured by pins or nuts into the opposite side of the arm. The driving-shaft J is also secured so that the projecting portion J', on which the base-plate D is mounted, will extend from the left side of the frame B, as viewed from the rear of the plow. The diagonal brace-bar S and stay-bar h are connected to the other limb of the frame B, and the piece d' is likewise secured to locate the slotted end on the right side of the machine. The bracket-arm being now clamped to the handles or beam of the plow completes the attachment of the seeding device to a left-hand plow, which in operation is identical with a right-hand plow, except in the direction of turning the furrow-slice.

It will be observed that the hinged connection of the frame B with the bracket-arm B² will allow the seeding-machine to rise and fall with the undulations of the ground traveled over, so that the seed will be planted at uniform depth with regard to ground surface.

Several important features of advantage pertain to the employment of a seeding device attached to and operating directly in conjunction with a plow while the soil is being turned and loosened by the plow, the more important of which will be mentioned.

First, the immediate planting of corn or other seed when the soil is freshly loosened will have a tendency to quicken its sprouting and assure its growth, and if the harrowing operation is performed directly after the plowing and seeding is completed all traces of the work of seeding are obliterated, and thus gophers and squirrels are not so liable to find the seed and destroy it.

Another feature of advantage obtained by simultaneously planting the seed while the plowing is being performed consists in the more ready control of weeds that are in seed when the soil is plowed, as these weed-seeds, being deposited at the same time that the corn is planted, will not get a start ahead of the corn, and the latter will grow more rapidly by reason of the moisture in the fresh soil, so that the weeds may be easily eradicated without danger of uprooting the corn.

By the planting of corn when the plowing is effected the time of execution of the work is considerably shortened, and thus time is afforded in the spring to sow other crops of small grain, while the corn-planting can be delayed to permit this work to be executed without the least detriment to the corn crop.

The combination of the seed-planter with the plow in the manner hereinbefore set forth does not materially increase the draft of the plow, and it is labor-saving as well as economizing time in the farming operations.

It is preferred to construct the device mainly of metal, and from its form it may be rendered light and strong as well as moderate in first cost to the manufacturer.

Many slight changes might be made in the form of the parts of this device and their relative arrangement without departure from the spirit or exceeding the scope of my invention; hence I desire to be allowed a reasonable latitude in the matter of details of construction, and do not wish to be restricted to the exact forms of the parts herein shown; but, Having fully described my invention, what I claim as new, and desire to secure by Letters Patent, is—

1. A seeding attachment for a walking-plow which may be regulated for depth of seed-planting, and also the spacing apart of individual seed or groups of the grain as it is being planted, substantially as set forth.

2. A seeding attachment for plows, which is adapted to be removed at will and attached to either a left or a right hand plow, substantially as set forth.

3. A seeding attachment for a right or left hand walking-plow, which is removably secured to the plow and adapted to plant seed at different depths by changing its adjustment on the plow, substantially as set forth.

4. A seeding attachment for a right or left hand walking-plow, comprised of a frame, a land-wheel, and seed-dropping mechanism which is actuated by the revolution of the land-wheel, substantially as set forth.

5. A seeding attachment for a left or right hand walking-plow, having a frame which is hinged to the plow, so as to vibrate vertically independent of the plow, a land-wheel supported to rotate on the frame, and a seed-dropping device, which is operated by the revolution of the land-wheel when the plow is in use and turning a furrow-slice, substantially as set forth.

6. A seeding attachment for a right or left hand walking-plow, which is adapted to drop seed a given depth and be thrown out of use when the plow is in motion, substantially as set forth.

7. A seeding attachment for a right or left hand walking-plow, that is hinged to allow it to conform to the undulations of the ground operated upon and adapted to plant seed at a predetermined depth, space apart individual seeds or groups of seed, and be arrested from dropping seeds while the plow is in motion and turning a furrow-slice, substantially as set forth.

8. The combination, with a plow that turns a furrow to the right or left, of a frame, a driving-shaft, a land-wheel that is adapted to run loose on the shaft or be locked fast to it, and a seeding device which is operated by the land-wheel when the plow is given a forward motion, substantially as set forth.

9. The combination, with a plow, of a reversible bracket-arm, a hinged frame, a driving-shaft, a land-wheel, and seed-dropping mechanism which is adapted to be changed in adjustment for regulating the depth of seed-planting, and also the distance of spaced separation of individual grains or groups of seed, substantially as set forth.

10. In a seeding attachment for right or left hand plows, the combination, with a plow, a bracket-arm removably attached to the plow to operate in advance of or in the rear of the mold-board, and a hinged frame, of a driving-shaft, a land-wheel mounted on the driving-shaft, a device to lock the land-wheel to the shaft or release it, and a seed-dropping device which is supported on the driving-axle, and is adapted to periodically deposit seed in plowed soil which has been turned by the plow, substantially as set forth.

11. In a seeding attachment for walking-plows, the combination, with a plow-beam, a bracket-arm adjustably attached to the beam, and a frame which is hinged to the bracket-arm, of a driving-shaft supported to revolve on the frame, a land-wheel mounted loosely on the driving-shaft, a device to shift the land-wheel on the shaft and lock it thereto, a base-plate, a seed-hopper, and seed-dropping mechanism mounted on the base-plate and adapted to be operated by the revolution of the driving-shaft and land-wheel, substantially as set forth.

12. In a seeding attachment for a walking-plow, the combination, with the handles of a plow, a bracket-arm removably and extensibly secured to these handles, and a frame that is hinged to have vertical vibration on the bracket-arm, of a driving-shaft revolubly secured in the frame, a land-wheel slidingly mounted on the driving-shaft, a shifting-lever to move the land-wheel, and means to lock it to the driving-shaft, substantially as set forth.

13. In a seeding attachment for plows, the combination, with the handles of a right or left hand plow, a bracket-arm, a frame, a driving-shaft, a land-wheel, a lever that is adapted to shift the land-wheel longitudinally of the driving-shaft, and a means to interlock the driving-shaft and land-wheel when it is shifted on the shaft, of a base-plate, a seed-hopper, and dropping mechanism which is supported on the base-plate and actuated by a pinion which is mounted on the driving-shaft and revolves when the plow is moved forwardly to turn a furrow-slice, substantially as set forth.

In testimony whereof I affix my signature in presence of two witnesses.

JAMES SEYMOUR HIBBETS.

Witnesses:
J. L. CONSTABLE,
C. T. MENSSO.